United States Patent [19]

Oberländer et al.

[11] Patent Number: 5,040,352

[45] Date of Patent: Aug. 20, 1991

[54] NOISE-PROTECTION ELEMENTS OF ACRYLIC GLASS

[75] Inventors: Klaus Oberländer, Hanau; Norbert Brand, Darmstadt; Kurt Kirdorf, Kahl, all of Fed. Rep. of Germany; Peter Seelmann, Vienna; Heinz Wachter, Ebergassing, both of Austria

[73] Assignee: Degussa Aktiengesellschaft, Frankfurt am Main, Fed. Rep. of Germany

[21] Appl. No.: 550,502

[22] Filed: Jul. 10, 1990

[30] Foreign Application Priority Data

Jul. 13, 1989 [DE] Fed. Rep. of Germany ....... 3923036

[51] Int. Cl.⁵ .......................... E01F 8/00; E04C 5/07; E04C 2/54; B32B 27/12
[52] U.S. Cl. ..................................... 52/789; 52/309.7; 52/309.1
[58] Field of Search ............... 52/309.3, 309.7, 309.16, 52/789, 223–230, 785, 788, 790, 793; 428/38, 34

[56] References Cited.

U.S. PATENT DOCUMENTS 3,783,084 1/1974 Quenett ................................ 52/789

FOREIGN PATENT DOCUMENTS 2555382 6/1976 Fed. Rep. of Germany ........ 52/789
2529609 1/1984 France ................................ 52/789

*Primary Examiner*—Richard E. Chilcot, Jr.
*Assistant Examiner*—Kien T. Nguyen
*Attorney, Agent, or Firm*—Cushman, Darby & Cushman

[57] ABSTRACT

Noise-abatement panels of acrylic glass are secured against fragmentation by plastic threads, plastic bands or a plastic net embedded in them approximately in the middle. If the acrylic glass breaks, the threads, bands or nets hold the fragments together.

10 Claims, 3 Drawing Sheets

NOISE-PROTECTION ELEMENTS OF ACRYLIC GLASS

The present invention relates to noise abatement elements of shatter-proof acrylic panels.

BACKGROUND OF THE INVENTION

In many instances, acrylic panels are preferred over other materials in the construction of noise-abatement walls in public traffic areas. However, if a vehicle strikes such a noise-abatement element, it shatters and the fragments will fall onto the traffic area.

It is known to protect against this fragmentation by means of wide-meshed catch nets which are stretched over the noise-abatement elements and also prevent rather small fragments from falling out. However, there are many disadvantages to this approach. The ability to see through the acrylic glass is adversely affected to a considerable extent. The catch nets must be re-tightened at regular intervals. Leaves, dust and other debris can be trapped in the catch nets. The catch nets must be removed in order to clean the noise-abatement elements.

SUMMARY OF THE INVENTION

The object of the present invention is to provide noise-abatement elements which avoid the foregoing difficulties. The present invention achieves this object by providing noise abatement elements in which transparent acrylic panels contain plastic threads, fibers, filaments, plastic bands or a plastic net embedded approximately in their middle.

The embedded plastic threads can be arranged in such a manner that they run parallel to each other in only one direction or in such a manner that they run parallel to each other in each of two directions. In the latter instance, the two directions can form an angle of 90° or also an angle deviating from 90°. If plastic bands are embedded, they are arranged with advantage in such a manner that they run parallel to each other in only one direction.

Monofilaments of polyamide or polypropylene are especially well-suited as plastic threads because the adhesion between such threads and the acrylic glass surrounding them is relatively low. For the same reason, polyamide and polypropylene are also the preferred materials for plastic bands. Monofilaments, of a diameter 0.2 mm to 2.0 mm, are preferred. Plastic bands, which may be composed of film or fibers, optionally bonded together, may have a width of 5 mm to 25 mm and a thickness of 0.2 mm to 2.0 mm. If the acrylic glass breaks, the threads or bands can expand and consequently do not tear apart but rather hold together the fragments being created. The lateral distance between adjacent threads or bands should be in a range between 10 and 100 mm.

Additional strips, ornaments or figures can be embedded in the noise-abatement elements of the invention which have the function of shaping the elements and/or protecting them from birds.

The noise-abatement elements of the invention are distinguished by several advantageous qualities: The embedded plastic threads, plastic bands or plastic nets are almost invisible, so that the ability to see through the element is retained. Since the plastic threads, plastic bands or plastic nets are embedded in the interior of the elements, they are optimally protected against the effects of weather. The cleaning of the elements poses no problems at all.

BRIEF DESCRIPTION OF THE FIGURES OF THE DRAWINGS

The invention will be better understood from the following detailed description, reference being made to the drawing in which:

FIG. 1 shows a cast acrylic glass panel 1 in which plastic threads 2 are embedded. The plastic threads are parallel to each other and are approximately midway between the faces of the panel. Such a plate can be manufactured using two glass plates, spaced apart from one another with a peripheral seal around the edges of the space between them. Plastic threads are inserted approximately in the middle of the space between the glass plates. Then, a syrup based containing methylmethacrylate monomer is then filled into the space between the glass plates, and hardened to a high-molecular polymerizate in a water bath.

FIG. 2 shows a composite element consisting of two prefabricated acrylic glass panels 3 and 4 connected to one another by an intermediate layer 5. Plastic threads 2 are embedded in the intermediate layer which, once again, run parallel to each other approximately in the middle of the space between the outer panels. Such a composite element can be manufactured by positioning the outer panels with a peripheral seal. The plastic threads are inserted approximately in the middle of the space between the panels. A cold-hardening methacrylate resin is then filled into the intermediary space and allowed to harden.

FIG. 3 shows a composite element consisting once again of two prefabricated acrylic glass plates 3 and 4 connected to one another by an intermediary layer 5. This embodiment differs from FIG. 2 in that there are two sets of plastic threads 2 embedded in the intermediary layer approximately in the middle. In each set, the threads run parallel to each other, and the two sets intersect one another at an angle of 90°.

Fig. 4 shows a composite element consisting once again of two prefabricated acrylic glass plates 3 and 4 connected to one another by an intermediary layer 5. Instead of monofilament threads, a flat-threaded plastic net 6 is embedded in the intermediary layer approximately in the middle.

FIG. 5 shows a composite element which corresponds to a large extent to the one represented in FIG. 2. However, opaque strips 105 are pressed on the inner surface of the prefabricated acrylic glass plate 4 which faces the intermediate layer 5. The opaque strips are arranged in such a manner that every second plastic thread 2 is covered. The strips have the function of repelling birds.

FIG. 6 shows a plurality of panels 106 according to the invention, supported by upright posts 7 along a highway. Automobiles 8, which comprise a source of noise, travel along the highway, and the panels reduce the amount of sound which is transmitted to buildings adjacent to the highway.

The manufacture and testing of a few noise abatement elements of the invention is explained in more detail in the following examples:

EXAMPLE 1

Figure 1:
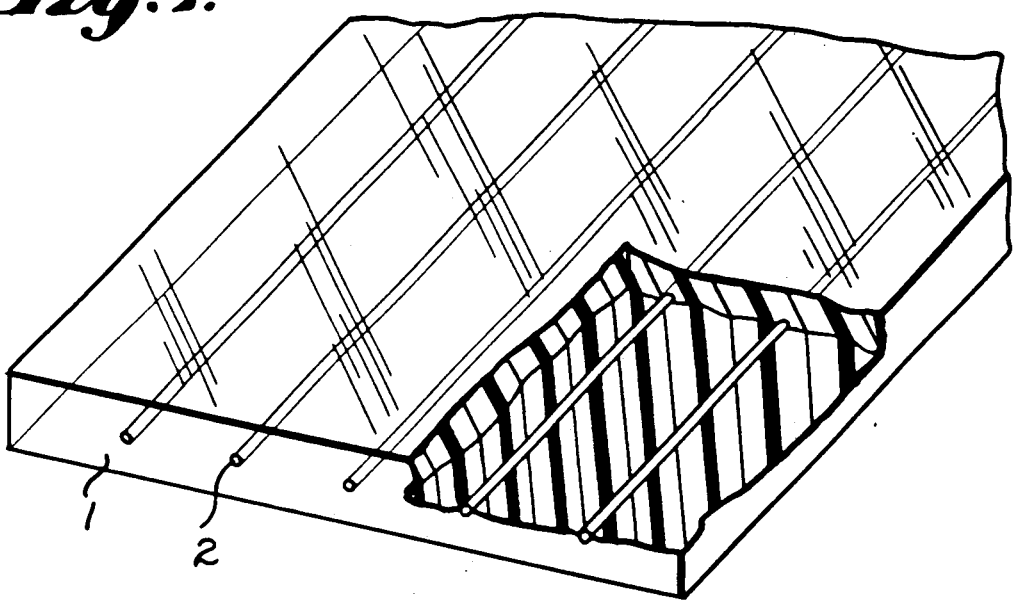
FIG. 1 illustrates an embodiment of the invention, in perspective.

In order to manufacture an acrylic glass plate according to FIG. 1, the edges of two plates of polished silicate glass 2 meters×3 meters were sealed by a circumferential seal 20 mm thick, thereby creating a polymerization chamber between the plates. Polyamide monofilaments with a diameter of 0.5 mm which were mounted midway between the glass plates, parallel to each other at intervals of 30 mm. Then the chamber was filled with a methyl methacrylate syrup containing a free radical initiator. The filled chamber was placed in a heated water bath and the syrup was hardened to a plate of high-molecular polymethylmethacrylate. The hardened polymer panel was removed from the mold, providing a cast acrylic glass plate approximately 2 m×3 m in size and 20 mm thick with the polyamide threads embedded approximately in the middle.

The plate, supported freely on two sides in conformity with DIN 52290, was shattered by a steel ball with a mass of 4.1 kg falling from a height of 9 meters. However, the fragments created were held together by the embedded threads.

EXAMPLE 2

Figure 2:
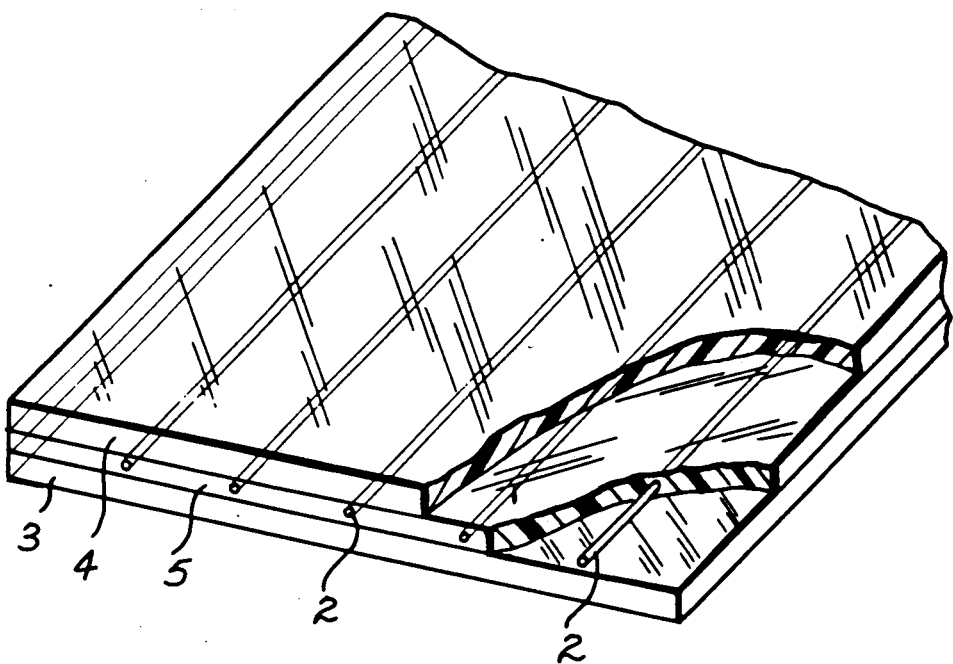
FIGS. 2-5 illustrate other embodiments in perspective, partly in section.
Figure 3:
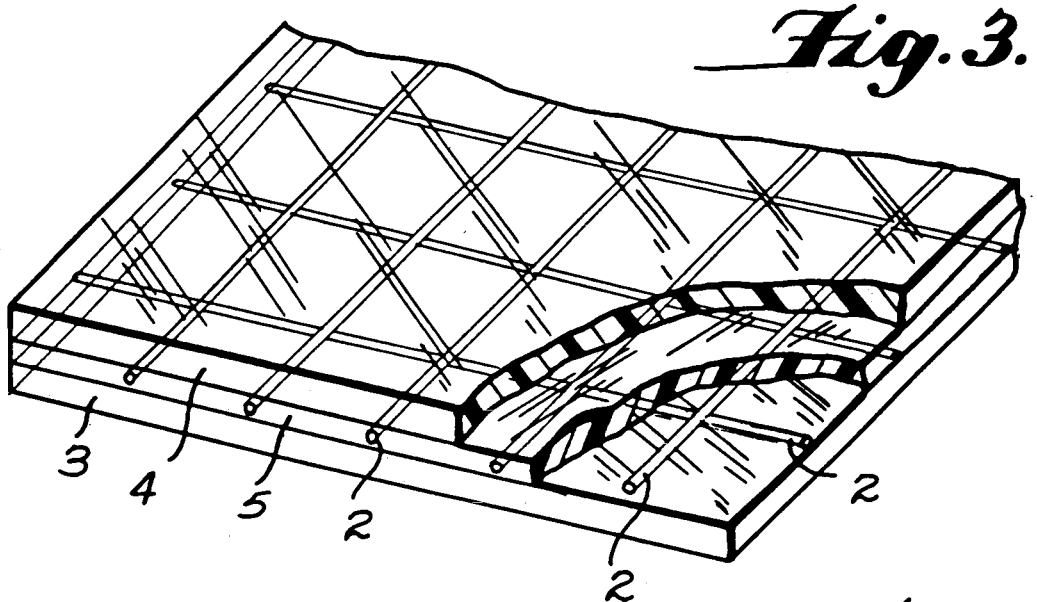
Figure 5:
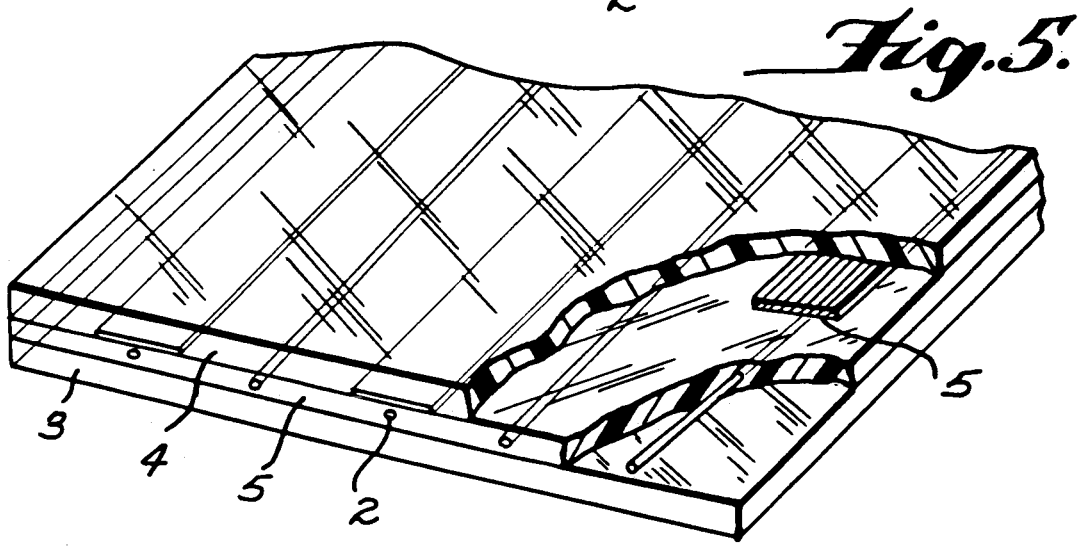
Figure 4:
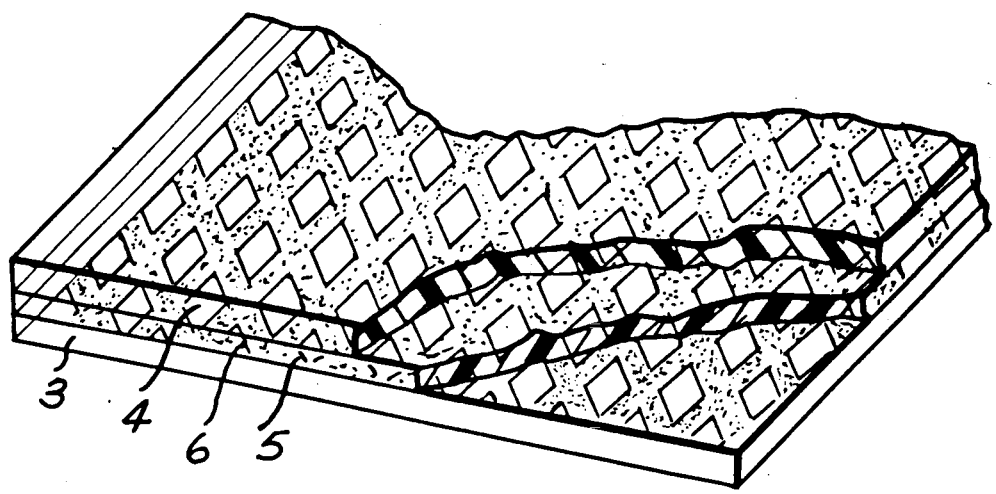
Figure 6:
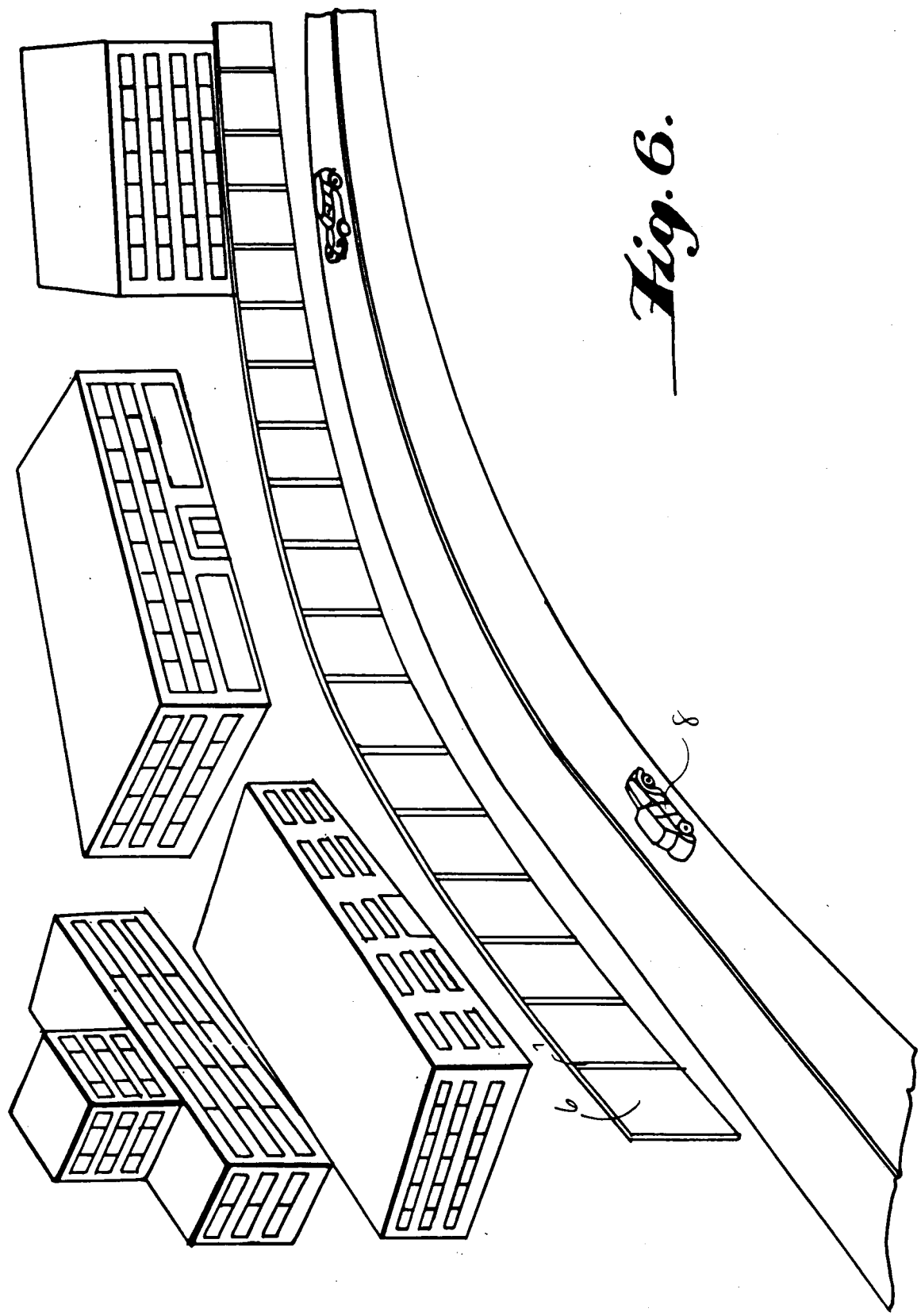
FIG. 6 illustrates the use of the composite elements of the invention as a sound barrier.

In order to manufacture a composite element according to FIG. 2, a chamber was formed from two prefabricated, cast acrylic glass plates (2000 mm×1220 mm×8 mm) with the aid of a circumferential seal 4 mm thick. Polyamide monofilaments having a diameter of 0.9 mm which were mounted in this chamber, approximately midway between the acrylic glass panels, at intervals of 30 mm. Then, a low-viscosity, cold-hardening methacrylate resin containing an external softener based on a citric acid ester and containing a redox initiator system was filled into the chamber. The intermediary layer was allowed to harden, and a composite element was obtained which included the original two acrylic panels joined by the monofilament-containing plate which had formed by polymerization.

This composite was subjected to the same breaking test as Example 1. The fragments created were again held together by the embedded threads.

EXAMPLE 3

The method of Example 2 was repeated except that a polyamide mesh fabric was used in place of the parallel monofilaments. The mesh fabric consisted of monofilaments with a diameter of 1.2 mm and a mesh width of 8 mm×8 mm.

In the break test according to Example 1, the fragments created were held together by the embedded fabric.

EXAMPLE 4

The method of Example 2 was repeated using polyamide bands (stretched packing band with a width of 12 mm and a thickness of 0.6 mm) at intervals of 40 mm, instead of the monofilament polyamide threads. These bands were embedded in the intermediary layer.

In the break test described in Example 1, the fragments were held together by the embedded bands.

We claim:

1. A transparent noise-abatement panel comprised of a transparent polymer panel having spaced parallel faces and containing plastic threads, plastic bands or a plastic net embedded approximately midway between said parallel faces, and extending parallel to said faces.

2. A noise-abatement panel according to claim 1 in which the embedded plastic threads or plastic bands run parallel to each other in one direction.

3. A noise-abatement panel according to claim 1 in which the embedded plastic threads run parallel to each other in two directions.

4. A noise-abatement panel according to claim 3 in which the two directions form an angle of 90°.

5. A noise-abatement panel according to claim 3 in which the two directions form an angle deviating from 90°.

6. A noise-abatement panel according to any one of claims 1 to 5 which contain additional embedded strips or ornaments which have the function of shaping the panel and/or of protecting it against birds.

7. A noise abatement system comprising a source of noise, a plurality of the panels of any one of claims 1 to 5 and means mounting said panels in a vertical position adjacent to the source of noise.

8. A noise abatement system as set forth in claim 9 in which there is a structure adjacent said panels which receive a reduced level of noise from said source of noise, by reason of the noise abatement effect of said panels.

9. A transparent noise-abatement panel comprised of a transparent polymer panel having spaced parallel faces and containing plastic threads, plastic bands or a plastic net embedded approximately midway between said parallel faces, and extending parallel to said faces, the plastic threads being monofilaments of a member of the group consisting of polyamide or polypropylene with a diameter of 0.2 to 2.0 mm.

10. A transparent noise-abatement panel comprised of a transparent polymer panel having spaced parallel faces and containing plastic threads, plastic bands or a plastic net embedded approximately midway between said parallel faces, and extending parallel to said faces, the plastic threads or plastic bands running at a lateral distance of 10 to 100 mm.

* * * * *